United States Patent [19]

Tsunekawa et al.

[11] 4,293,877
[45] Oct. 6, 1981

[54] PHOTO-SENSOR DEVICE AND IMAGE SCANNING SYSTEM EMPLOYING THE SAME

[75] Inventors: Tokuichi Tsunekawa, Yokohama; Makoto Masunaga, Tokyo; Kazuya Hosoe, Machida; Yukichi Niwa; Mitsutoshi Owada, both of Yokohama; Noriyuki Asano, Kawasaki, all of Japan

[73] Assignee: Canon Kabushiki Kaisha, Tokyo, Japan

[21] Appl. No.: 25,542

[22] Filed: Mar. 30, 1979

[30] Foreign Application Priority Data

Mar. 31, 1978 [JP] Japan ................................. 53-38565

[51] Int. Cl.³ .................... H04N 3/15; H01L 27/14
[52] U.S. Cl. .................... 358/213; 358/221; 357/24; 357/30; 307/221 D; 250/211 J
[58] Field of Search ............. 358/212, 213, 221, 167, 358/113, 280, 293, 294, 285, 3; 307/311, 310, 221 D; 250/211 J, 578, 332, 201, 208, 209; 354/23 R, 25; 357/30, 28, 24; 328/151; 330/289; 356/1, 4

[56] References Cited

U.S. PATENT DOCUMENTS

| | | | |
|---|---|---|---|
| 2,954,428 | 9/1960 | Mason | 358/294 |
| 3,428,828 | 2/1969 | Korzekwa et al. | 328/151 |
| 3,584,146 | 6/1971 | Cath et al. | 358/221 |
| 3,737,571 | 6/1973 | Gaebele et al. | 358/221 |
| 3,830,972 | 8/1974 | Siverling et al. | 358/16 D |
| 4,064,533 | 12/1977 | Lampe et al. | 358/213 |

FOREIGN PATENT DOCUMENTS 2729402  1/1978  Fed. Rep. of Germany ...... 358/221

OTHER PUBLICATIONS

Sequin et al., "All-Solid-State Camera for the 525-line Television Format", *IEEE Transactions on Electron Devices*, vol. ED-23, No. 2, pp. 183–189, Feb. 1976.

Chai et al., "Noise Compensator for Charge-Coupled Devices", *IBM Technical Disclosure Bulletin*, vol. 16, No. 4, Sep. 1973, pp. 1099, 1100.

*Primary Examiner*—John C. Martin
*Attorney, Agent, or Firm*—Fitzpatrick, Cella, Harper & Scinto

[57] ABSTRACT

A photo-sensor device comprises a light receiving part composed of a plurality of photo-sensor elements for converting photosignals into electrical signals. A portion of the light receiving part is shielded by light shielding means so that in reading out the output from the device, there can be obtained also a signal of dark current information from the shielded photo-sensor elements.

25 Claims, 10 Drawing Figures

PHOTO-SENSOR DEVICE AND IMAGE SCANNING SYSTEM EMPLOYING THE SAME

BACKGROUND OF THE INVENTION

1. Field of the Invention

The present invention relates to photo-sensor device which per se is known as self-scanning type photo-diode array, CCD photo-sensor, CCD photo-diode array, that is, a combination of CCD and photo diodes and the like. Also, the present invention relates to an image scanning system in which such photo-sensor device is used as image scanning means.

2. Description of the Prior Art

With the rapid and remarkable development of techniques about semiconductor in these years, there have been available various inexpensive self-scanning type photo-sensor devices such as self-scanning type photo-diode array, CCD photo-sensor and CCD photo-diode array, that is, a combination of CCD and photodiodes. This technical innovation also has led us to some attempts to make use of such photo-sensor device as electrical scanning means. For example, attempts have been made to automatically detect the distance to an object or the focusing of optical system to an object by means of scanning output signals derived from such photo-sensor device.

U.S. Pat. No. 4,004,852 has disclosed the use of photo-sensor device in an automatic and electronic range finder instrument. According to the system proposed by the patented invention, a basic view field image of a target object and a reference view field image of the same object are formed by a base line range finder type optical system simultaneously. The reference view field image is so formed as to contain therein the basic view field image and to cover a larger area than that of the latter. These two images are scanned by a photo-sensor device as mentioned above to obtain signals of scanned picture elements of the two images. These signals are binary coded by a binary coding circuit and then stored in shift registers respectively. Data of binary coded picture elements of the basic view field image and those of the reference view field image are compared to each other to know the corelation of the two images. As for the reference view field image, a detection is carried out to find out such image portion which may be considered to be coincident with the basic image or to be most analogous to the latter. From the alignment of such analogous image portion in the reference view field image, namely from the information of position where such analogous image portion is existing, man can know the distance up to the target object.

An electronic type automatic range finder system similar to the above described one is disclosed also in U.S. Pat. No. 4,078,171.

In detecting the distance to an object or the focus of an optical system to an object relying upon the scanning output signals from a photo-sensor device used as image scanning means in a manner as mentioned above, however, some requirements must be satisfied to assure a sufficiently high accuracy of detection. As a matter of course, the circuit for processing the scanning output signals must be improved accordingly. But, the most important problem is to obtain a scanning output signal correctly and precisely corresponding to the image while excluding all noise signals.

As known to those skilled in the art, the scanning output signals read out from a photo-sensor device generally and necessarily contain some disturbing noise signals such as dark current signal which have a great adverse effect on the detection accuracy. In particular, variation of dark current is inherent to such photo-sensor device. When the time required to integrate signals of the photo-sensor device is relatively long, the variation of dark current becomes much increased. Even when the time is relatively short, the dark current may vary greatly with rising up of atmospheric temperature. Therefore, it is absolutely necessary to provide means for effectively excluding noise of dark current from the scanning output signals. Otherwise, no assurance of detection accuracy or no improvement of detection accuracy is obtainable.

Another problem to be solved concerns the variation of voltage applied to the photo-sensor device. In case of CCD photo-sensor or CCD photo-diode array, a photo-gate voltage must be applied to the light receiving part to have the produced electric charge accumulated therein. On the other hand, to adjust the depth of potential well at the light receiving part, transfer gate part and charge transfer part, it is required to apply a bias voltage to the substrate. As well known in the art, variation in the photo gate voltage or in the substrate bias voltage often results in variation of the level of scanning output signal then obtained. A similar problem occurs also for self-scanning type photo-diode array. In this case, there must be applied a charging voltage to charge the p-n capacitor of each photo diode. Variation in the charging voltage will again lead to variation of the level of scanning output signal then obtained. For the reason, in order to attain a high accuracy of detection as desired, this problem should be solved effectively by providing means for positively excluding such variation component from the scanning output signals.

SUMMARY OF THE INVENTION

Accordingly, it is primary object of the present invention to provide a novel photo-sensor device which eliminates the problem of disturbing noise signals such as that of dark current mentioned above.

It is another object of the invention to provide a novel photo-sensor device which eliminates the problem of variation in level of the output of the device caused by variation of the voltage applied to it.

It is a further object of the invention to provide an image scanning system in which a photo-sensor device of the above mentioned type is used as image scanning means and which allows an image scanning output correctly and precisely corresponding to the pattern of the image of an object formed by an optical system to be obtained while excluding all of the harmful noise signals such as dark current signals from the output.

It is still a further object of the invention to provide an image scanning system in which a photo-sensor device of the above mentioned type is used as image scanning means and which allows an image scanning output correctly and precisely corresponding to the pattern of the image of an object formed by an optical system to be obtained while eliminating the problem of variation in level of the output caused by the variation of voltage applied to the photo-sensor device.

According to one aspect of the invention to attain the first mentioned object it is proposed to shield a portion of the light receiving part comprising a plurality of photo-sensor elements to obtain a signal informing of dark current from the shielded photo-sensor elements. With this arrangement of photo-sensor device, when the output from the device is read out, an electrical signal indicative of a dark current in the light receiving part is also obtained from the shielded elements. Therefore, by subtracting the electrical signal coming from the shielded portion from that coming from the unshielded portion using a suitable circuit there can be obtained a signal free of disturbing noise signal attributable to the dark current. Thus, the photo-electrically converted signal then obtained correctly and precisely corresponds to the distribution of brightness of the light then incident upon the light receiving part.

According to another aspect of the invention to attain the second object mentioned above, it is proposed to provide voltage variation detection means. This detection means detects any variation of the internal voltage within the photo-sensor device relative to the variation of voltage externally applied thereto and issues an electrical signal informing of the variation. With this arrangement, it becomes possible to exclude the component attributable to the voltage variation due to the output signal of the sensor device making use of the output signal coming from the voltage variation detection means through a suitably formed circuit. Thus, the photo-electric signal finally obtained is free of such component attributable to the voltage variation and correctly corresponds to the distribution of brightness of the light actually received by the light receiving part. Variation of the output level is no longer caused by such voltage variation.

To solve the above problem of the output level being varied by a voltage variation, one may consider another solution. For example, it may be considered effective to provide a separate detection circuit independently of the photo-sensor device for detecting the voltage variation and to compensate the output of the device by the output from the separate detection circuit. However, since the variation of internal voltage within the device is substantially different in phase and/or level of variation from the variation of external voltage which constitutes part of the a cause for the internal voltage variation, the above mentioned solution is not so effective for the problem and it is almost impossible to satisfactorily compensate the output level for the variation thereof caused by a voltage variation. On the contrary, according to the invention, the voltage variation is detected within the photo-sensor device and therefore the solution in accordance with the invention has no disadvantage which another solution has.

According to a further aspect of the invention to attain the third object mentioned above, there is provided an image scanning system in which the above described novel type of photo-sensor device is used as image scanning means and in which an additional circuit is provided which serves to sample and hold the dark current signal coming from the photo-sensor elements shielded against light. By providing such dark current signal sampling and holding circuit it is made possible to effectively exclude the component resulting from the dark current from the scanning output signal coming from the unshielded photo-sensor elements.

According to still a further aspect of the invention to attain the fourth object there is provided an image scanning system in which the above described novel type of photo-sensor device is used as image scanning means and in which an additional circuit is provided which has two inputs, one for the voltage variation signal coming from the above mentioned voltage variation detection means and another for the scanning output signal obtained from reading out of the output of the photo-sensor device. The circuit serves to eliminate the component of voltage variation from the scanning output signal. Thus, through the voltage variation component eliminating circuit there is obtained a true scanning output signal free of the component attributable to any voltage variation.

Other and further objects, features and advantages of the invention will appear more fully from the following description taken in connection with the accompanying drawings.

DETAILED DESCRIPTION OF THE PREFERRED EMBODIMENTS

Figure 1:
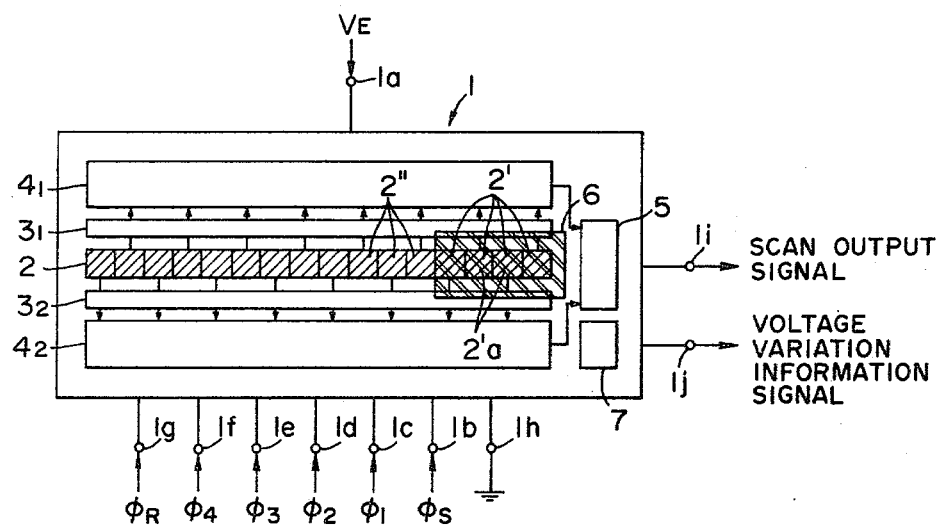
FIG. 1 is a schematic view of a photo-sensor device showing an embodiment of the invention.

Referring first to FIG. 1 showing an embodiment of the invention, a photo-sensor device is generally designated by 1. In this embodiment, a four phase transfer type of self-scanning CCD photo-sensor or CCD photodiode array is selected as the photo-sensor device 1 which has been modified in accordance with the invention.

Designated by 2 is a light receiving part where a photosignal is converted into an electrical signal. The light receiving part 2 comprises a plurality of light receiving elements each capable of generating electric charge corresponding to the light incident upon the element and of accumulating the charge in it. When CCD photodiode array which is, as well known, a combination of photo diodes and CCD is used, the light receiving part 2 is composed differently from the above but it is the same as the above in function.

$4_1$ and $4_2$ are electric charge transfer parts of which the first transfer part $4_1$ serves to take up the accumulated charge on a group of light receiving elements, for example, elements in odd numbers through a transfer gate $3_1$ and transfer the charge to an output part 5 successively in response to transfer clock. The second transfer part $4_2$ takes up the charge accumulated on the light receiving elements in even numbers through a second transfer gate part $3_2$ and transfer it to the output part 5 in the same manner. The output part 5 converts the electric charge transferred thereto by the transfer parts $4_1$ and $4_2$ into a corresponding voltage or current which is then put out from the output part.

Figure 6:
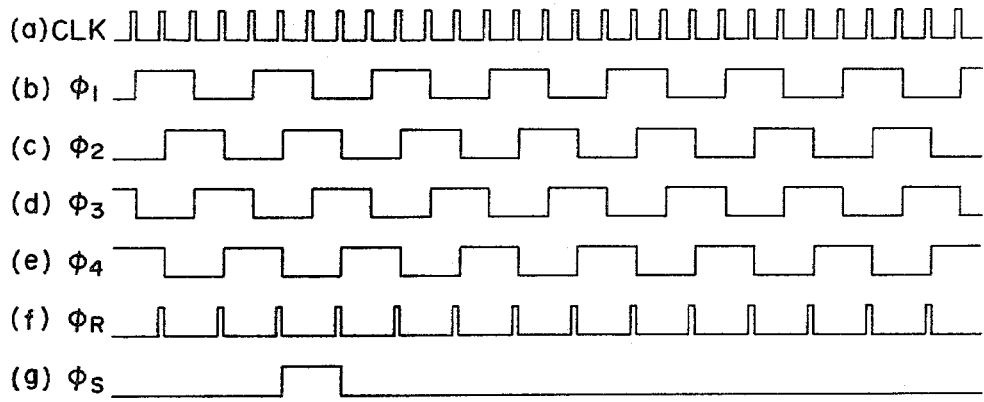
FIG. 6, including a–g, is a timing chart showing the output signals from the fundamental clock generator circuit and the driver circuit shown in FIG. 4.

$1a$ is a voltage input terminal through which voltage $V_E$ is applied to the light receiving part 2 as a photo gate voltage in the manner known per se (or the voltage $V_E$ becomes a substrate bias voltage). $1b$ is a start pulse input terminal through which start pulse $\phi_s$ (FIG. 6-(g)) is applied to the two transfer gate parts $3_1$ and $3_2$ as gate pulse. Through transfer clock input terminals $1c$, $1d$, $1e$ and $1f$ there are applied to the charge transfer parts $4_1$ and $4_2$ four phase transfer clocks $\phi_1$, $\phi_2$, $\phi_3$ and $\phi_4$ which are shifted in period by $\frac{1}{4}$ each other as shown in FIGS. 6-(b) to (e). These transfer clocks serve to initiate the charge transfer parts into taking up and transferring of the charges. $1g$ designates a reset pulse input terminal through which a reset pulse $\phi_R$ (FIG. 6-(f)) is applied to a charge resetting transistor at the output part 5. Designated by $1h$ is a ground terminal, and output terminal $1i$ of the device 1 are connected to the output part 5.

The above described arrangement concerns the case wherein CCD photo-sensor or CCD photo-diode array is used. For a conventional self-scanning type photo-diode array, the following changes will be made in the arrangement:

Light receiving elements constituting the light receiving part 2 are replaced by photo diodes respectively and the transfer gate parts $3_1$ and $3_2$ are replaced by a switch array of MOS-FET disposed to address the photo diodes. Also, the charge transfer parts $4_1$ and $4_2$ are replaced by shift registers for switch addressing. Pulses to be applied to the shift registers in this case are start pulse and such two clocks selected from the four phase clocks $\phi_1-\phi_4$ having an inverted relation to each other, for example, clocks $\phi_1$ and $\phi_3$. When the photo diodes are addressed by the shift operation of the shift registers ($4_1$, $4_2$), photo-electric signals are issued from the output terminal $1i$ through the corresponding FET switches in the array of MOS-FET switches ($3_1$, $3_2$). Thus, in this case, the above described output part 5 is no longer necessary. Also, in this case, the above mentioned voltage $V_E$ to be applied through the input terminal $1a$ is used as a charging voltage to charge p-n capacitors of the photodiodes.

The above described arrangement and structure of photo-sensor device 1 are known per se. Now, improvements made therein in accordance with the present invention will be described in detail.

The first feature of the invention is found in that a portion of the light receiving part 2 is covered with a shielding layer 6 which may be formed, for example, by vapour depositing of aluminum. In FIG. 1, those light receiving elements covered with the shielding layer 6 are designated by $2'$. Since the elements remain shielded against light, the electrical signal obtained from the elements $2'$ in reading out the output of the sensor device is obviously indicative of dark current present in the light receiving part 2. According to the invention, this electrical signal coming from the shielded elements $2'$ is used to exclude the component attributable to dark current from the electrical signal coming from the remaining unshielded elements $2''$, that is, the scanning output signal.

As for the shielding layer 6 note should be taken to the following points: The shielding layer 6 may be formed as an extension of a known shielding layer covering all the parts of the device except for the elements $2''$ to be remained unshielded.

In case of CCD photo-sensor or CCD photo-diode array it is preferable to select, as the shielded elements $2'$, those elements located near the output part 5, namely those elements whose electric charges are to be transferred to the output part 5 early in the period of charge transferring by the charge transfer parts $4_1$ and $4_2$.

In case of self-scanning type photo-diode array, it is also preferable to select, as the shielded elements $2'$, those photodiodes which are to be addressed early in the shift operation of the shift registers ($4_1$, $4_2$).

The number of elements to be shielded by the shielding layer 6 is preferably two or more.

Figure 2:
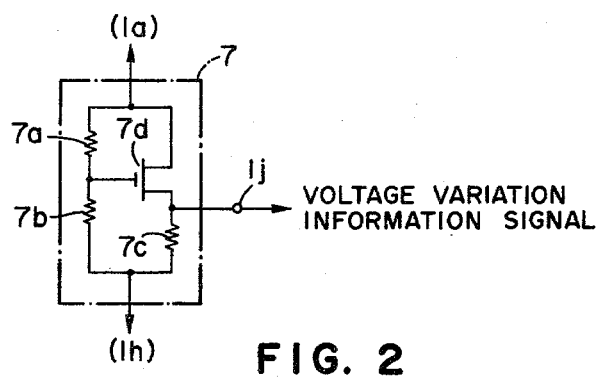
FIG. 2 is a circuit diagram of the voltage variation detection part in the photo-sensor device shown in FIG. 1.

The second feature of the present invention resides in the provision of a voltage variation detection part 7 the structure of which is seen in an equivalent circuit diagram in FIG. 2.

The detection part 7 is so formed as to detect the voltage variation within the device 1 relative to the variation of voltage $V_E$ applied to the device 1 through the input terminal $1a$ and produce an electrical signal corresponding to the detected voltage variation.

In FIG. 2, voltage divider resistances $7a$ and $7b$ are electrically connected to the input terminal $1a$ and to the ground terminal $1h$ through semiconductor channel respectively to divide the voltage $V_E$. $7d$ is a MOS-FET whose gate is electrically connected to the dividing point between the two voltage divider resistances $7a$ and $7b$. Its drain is connected to the input terminal $1a$ whereas the source is connected to the ground terminal $1h$ through a resistance $7c$. With this arrangement there is produced, at the junction between the source of FET $7d$ and the resistance $7c$, a voltage corresponding to the internal voltage in the device 1 relative to the voltage $V_E$. Therefore, when any variation occurs in $V_E$, there is obtained an electrical signal informing of the voltage variation within the device 1 relative to the voltage variation of $V_E$. Designated by $1j$ is an output terminal for the voltage variation information signal which is connected to the junction between the source of FET $7d$ and the resistance $7c$.

An image scanning system using the above described novel photo-sensor device is also a subject of the present invention. One form of such image scanning system is shown in FIGS. 3 and 4.

Figure 3:
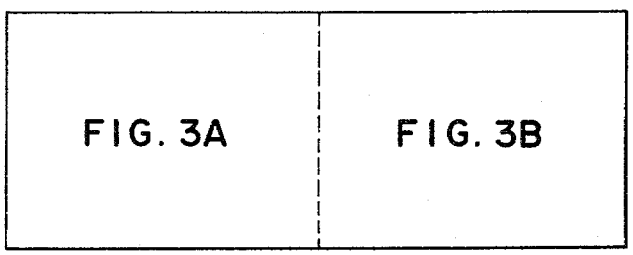
FIGS. 3A and 3B which are to be joined together in the manner indicated in FIG. 3 show an example of electric circuit of an image scanning system according to the invention in which the photo-sensor device shown in FIG. 1 is used.
Figure 4:
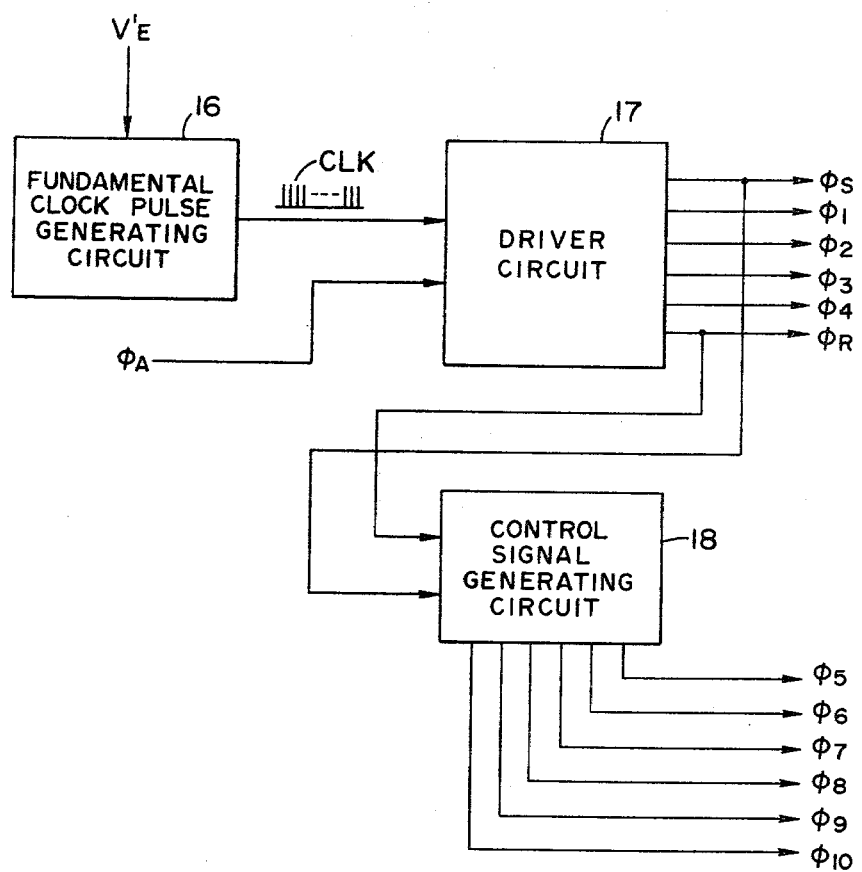
FIG. 4 is a block diagram showing a basic arrangement of circuit used to drive and control the photo-sensor device shown in FIG. 1 and the circuit system shown in FIG. 3.

The circuit system shown in FIG. 3 includes a circuit for removing the voltage variation component from the output signal of the sensor device 1 by means of voltage variation information signal obtained by the voltage variation detection part 7 of the device 1; a circuit for sampling and holding the signal coming from the shielded elements $2'$ of the light receiving part 2 as a dark current signal; a circuit for removing the dark current component from the scanning output signal coming from the unshielded elements $2''$ by means of the dark current signal sampled and held by the dark current signal sampling and holding circuit; and a circuit for binary coding the pure scanning output signal obtained after the noise signals being removed by the above mentioned circuits. Among these circuits, the last mentioned circuit, that is, the binary coding circuit is a part which does not constitute any feature of the present invention.

Figure 3A:
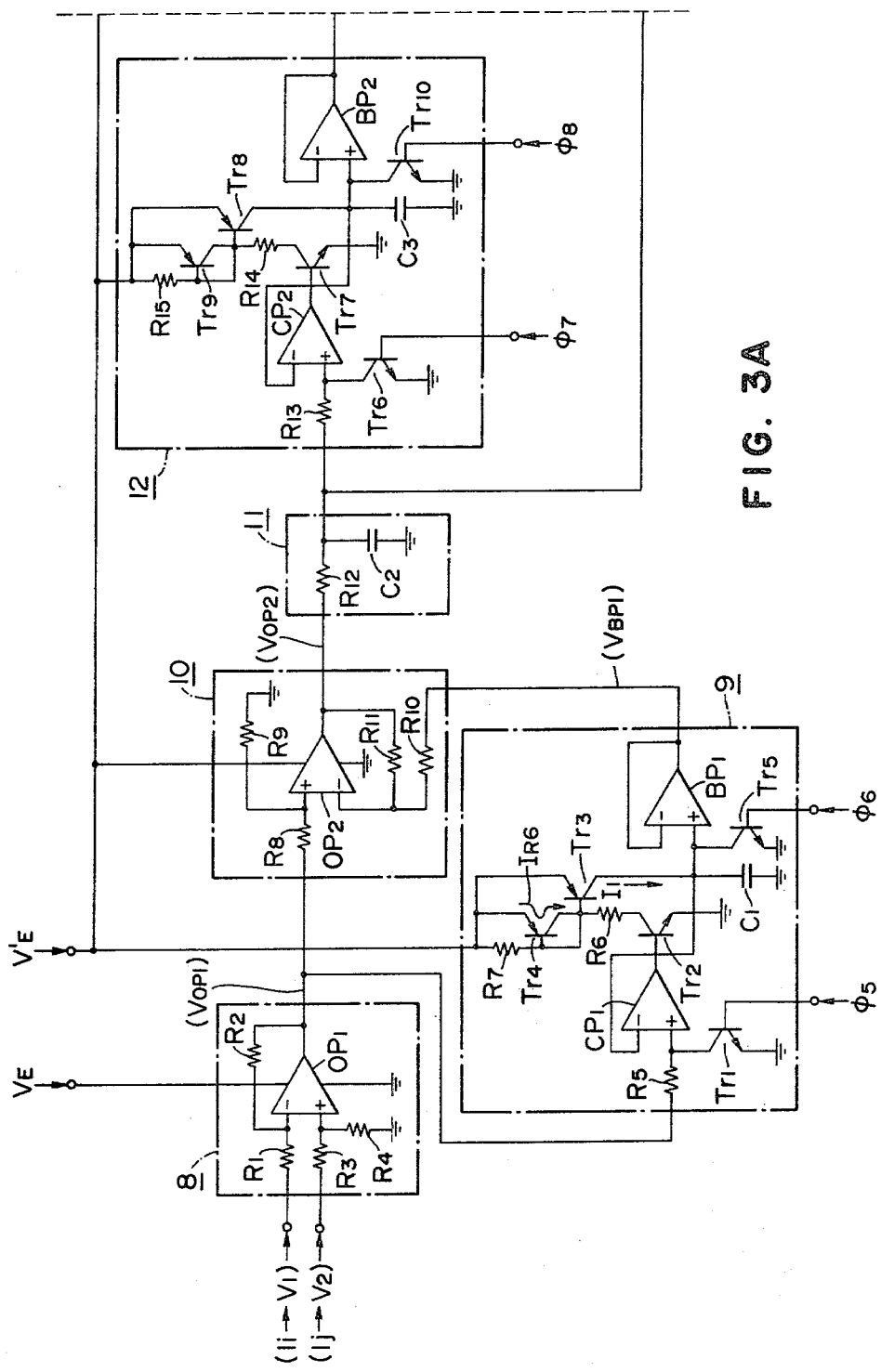
Figure 3B:
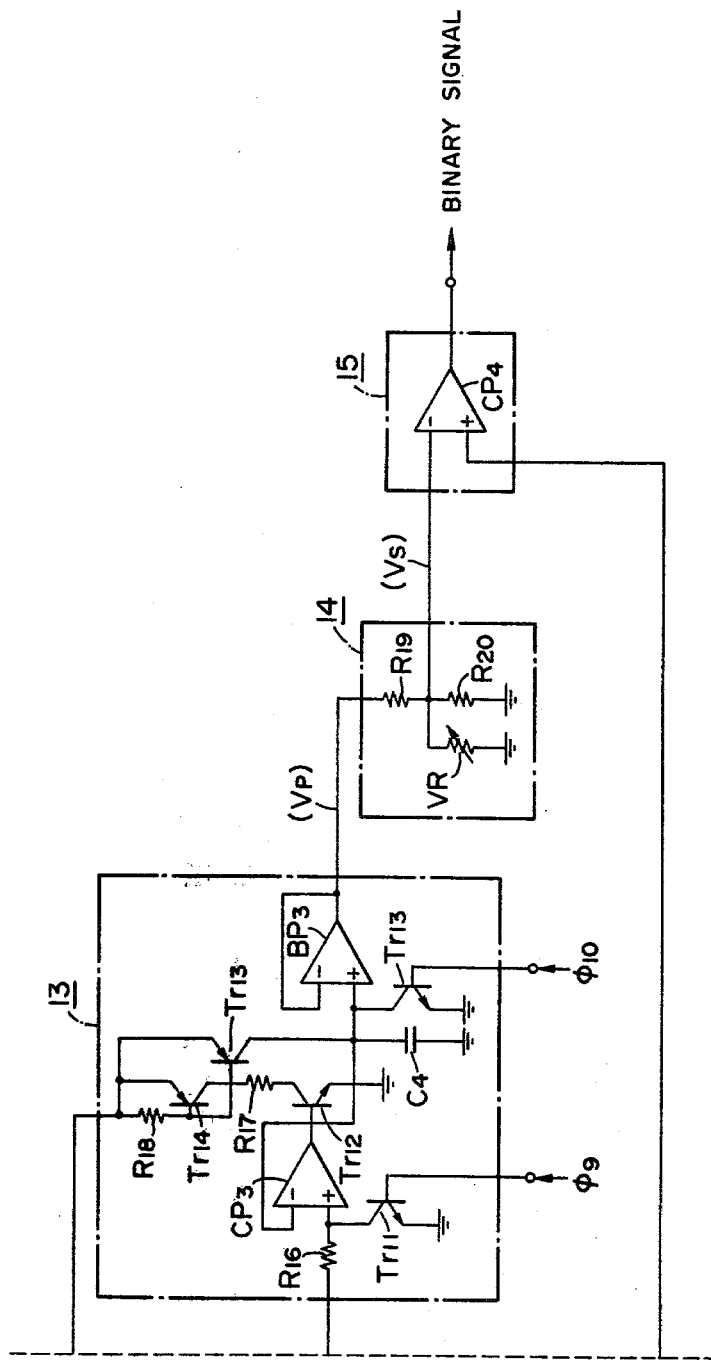

Now, the arrangement of the circuit system is described in detail referring to FIGS. 3A and 3B.

Generally designated by 8 is a differential amplifier circuit serving as the voltage variation component eliminating circuit mentioned above. Output signal from the output terminal 1$i$ of the sensor device 1 which output signal is hereinafter referred to as sensor output signal (FIG. 5($a$)) and output signal from the output terminal 1$j$, that is, the voltage variation information signal from the variation detection part 7 are introduced into the differential amplifier circuit 8 to remove the voltage variation component from the sensor output signal. The circuit 8 is constituted of an operation amplifier $OP_1$ and resistances $R_1$ ro $R_4$. The sensor output signal is applied to the inversion input terminal of the operational amplifier $OP_1$ through the resistance $R_1$. The voltage variation information signal is applied to the non-inversion input terminal of the operational amplifier $OP_1$ through the resistance $R_3$.

Generally designated by 9 is a dark current signal sampling and holding circuit which receives the output signal from the above circuit 8, that is, the sensor output signal free of any voltage variation component. The sampling and holding circuit 9 is so formed as to sample and hold only such portion of the received sensor output signal which corresponds to the output signal derived from the shielded light receiving elements 2' as a dark current signal. Comparator $CP_1$, resistances $R_5$–$R_7$, transistors $Tr_1$–$Tr_5$, condenser $C_1$ and buffer amplifier $BP_1$ constitute the dark current signal sampling and holding circuit 9. The output signal issued from the above described differential amplifier circuit 8 is allowed to enter the non-inversion input terminal of comparator $CP_1$ through the resistance $R_5$ only when the input control transistor $Tr_1$ is in its nonconductive state. At that time, to the inversion input terminal of the comparator $CP_1$ there is applied a voltage stored in the condenser $C_1$. The output from $CP_1$ is applied to the base of transistor $Tr_2$ in such manner that the charging level of condenser $C_1$ can be determined depending upon the level of input signal to the non-inversion input terminal. Therefore, condenser $C_1$ can be charged with constant current for a long time determined by the output of comparator $CP_1$, namely for a long time which corresponds to the level of the input signal applied to the non-inversion input terminal of comparator $CP_1$. As a result, this circuit operates in a manner of constant current operation. As previously mentioned, the input to the non-inversion input terminal of the comparator $CP_1$ is limited only to such a portion of the output signal from the circuit 8 which corresponds to the output signal coming from the shielded light receiving elements 2'. To this end, the input to the non-inversion input terminal of $CP_1$ is controlled by a control signal generating circuit which, as described hereinafter, applies a control signal $\phi_5$ (FIG. 5-($c$)) to the base of the input control transistor $Tr_1$. Before the output of the circuit 8 is applied to the non-inversion input terminal of $CP_1$, the storage value of $C_1$ is cleared up by a control signal $\phi_6$ (FIG. 5-($d$)) applied to the base of storage value clearing transistor $Tr_5$.

Generally designated by 10 is a differential amplifier circuit serving as the dark current component eliminating circuit mentioned above.

Output signal from the above mentioned circuit 8, that is, the sensor output signal freed of voltage variation component and output from the circuit 9, that is, the dark current information signal held by the condenser $C_1$ are introduced into the differential amplifier circuit 10. Operational amplifier $OP_2$ and resistances $R_8$ to $R_{11}$ constitute the circuit 10. The output from the differential circuit 8 is applied to the non-inversion input terminal of the operational amplifier $OP_2$ through the resistance $R_8$ whereas its inversion terminal receives the output signal from the dark current signal sampling and holding circuit 9 through the resistance $R_{10}$. The sensor output signal already freed from voltage variation component is further processed by this circuit 10 to remove the dark current component from it.

A filter circuit generally designated by 11 is provided to filter off any remaining high frequency noise component from the output signal coming out from the above differential amplifier circuit 10. The filter circuit 11 is composed of a resistance $R_{12}$ and a condenser $C_2$.

Other circuits generally designated by 12 to 15 are a circuit part which does not directly pertain to the subject of the present invention. The circuit part is required additionally for binary coding of the above described sensor output signal only when the photo-sensor device of the invention and the image scanning system employing the same are applied to an electronic and automatic range finder apparatus as proposed by the aforementioned U.S. Pat. No. 4,004,852.

Among these circuits, a circuit generally designated by 12 is a peak detection circuit for detecting the peak of the output signal of the above filter circuit 11, that is, the peak value of a sensor output signal which has already got free of voltage variation component, dark current component and high frequency noise component. Comparator $CP_2$, resistances $R_{13}$ to $R_{15}$, condenser $C_3$, transistors $Tr_6$ to $Tr_{10}$ and buffer amplifier $BP_2$ constitute the detection circuit 12. The peak detection circuit is so formed as to operate in a manner of constant current operating circuit like the above described dark current signal sampling and holding circuit 9.

The output signal coming from the above filter circuit 11 is applied to the non-inversion input terminal of the comparator $CP_2$ through the resistance $R_{13}$. This input to the non-inversion terminal is controlled by a control signal $\phi_7$ (FIG. 5-($e$)) applied to the base of the input control transistor $Tr_6$. The control is, in this case, made in such manner that only such portion of the output signal coming from the filter circuit 11 is applied to the non-inversion terminal which corresponds to the basic view field image previously described in connection with the range finder apparatus disclosed in U.S. Pat. No. 4,004,852. Before the output of the filter circuit is applied to the comparator $CP_2$, the storage value of the condenser $C_3$ is cleared up by a control signal $\phi_8$ (FIG. 5-($f$)) applied to the base of storage value clearing transistor $Tr_{10}$.

A circuit generally designated by 13 is a peak value holding circuit. This circuit serves to holding the peak value of the sensor output signal detected by the above peak detection circuit 12 for one scanning period of time. Comparator $CP_3$, resistances $R_{16}$ to $R_{18}$, transistors $Tr_{11}$ to $Tr_{15}$, peak value holding condenser $C_4$ and buffer amplifier $BP_3$ constitute the peak value holding circuit 13. Like the above described circuits 9 and 12, this circuit 13 is also formed as a constant current operation circuit. The output signal coming from the above peak detection circuit 12, that is, the peak value information signal stored in the condenser $C_3$ is applied to the non-inversion input terminal of the comparator $CP_3$ through the resistance $R_{16}$. Input of the peak value information signal to the comparator is controlled by a control signal $\phi_9$ (FIG. 5-(g)) applied to the base of the input control transistor Tr11 in such manner that the inputting may be effected only after the reading-out of the sensor output signal has been finished. Before this inputting of the peak value information signal to the comparator CP$_3$, the storage value of the condenser C$_3$ is cleared up by a control signal $\phi_{10}$ (FIG. 5-(h)) applied to the base of the storage value clearing transistor Tr15.

A circuit generally designated by 14 is a voltage dividing circuit serving as a slice level setting circuit.

Function of this circuit 14 is to set a slice level relying upon the output signal coming from the above peak value holding circuit 13, namely the peak voltage (hereinafter referred to as V$_p$) stored in the condenser C$_4$. The slice level is used as a basis on which the sensor output signal is binary coded.

Voltage divider resistances R$_{19}$ and R$_{20}$ and variable resistance for adjustment VR constitute the voltage dividing circuit 14. A voltage obtained at the dividing point between R$_{19}$ and R$_{20}$ which is hereinafter referred to as Vs is used as the slice level for binary coding.

Designated by 15 is a binary coding circuit for binary coding the output signal coming from the above filter circuit 11 making use of the above mentioned output voltage Vs of the circuit 14 as a slice level. The circuit 15 comprises a binary coding comparator CP$_4$ which receives at its non-inversion input terminal the output from the filter circuit 11 and at its inversion input terminal the output voltage Vs from the voltage dividing circuit 14.

FIG. 4 shows a basic form of a control signal generating circuit for generating various clocks and control pulses such as start pulse $\phi_S$, transfer clocks $\phi_1$-$\phi_4$ and reset pulse $\phi_R$ required to drive the sensor device 1 and control signals $\phi_5$-$\phi_{10}$ required to control the above described circuits 9, 12 and 13. In FIG. 4, the reference numeral 16 designates a fundamental clock pulse generating circuit for generating fundamental clock CLK (FIG. 6-(a)). 17 is a driver circuit for generating the above mentioned start pulse $\phi_S$, transfer clocks $\phi_1$-$\phi_4$ and reset pulse $\phi_R$ to drive the sensor device 1 in accordance with the start signal $\phi_A$ externally given and the fundamental clock pulse CLK given by the fundamental clock generating circuit 16. The driver circuit 17 is formed in a manner known per se and comprises a frequency dividing counter and a group of logical gates.

18 is a control signal generating circuit for generating the above mentioned control signals $\phi_5$-$\phi_{10}$ to control the dark current signal sampling and holding circuit 9, peak detection circuit 12 and peak value holding circuit 13. The circuit 18 comprises a counter or shift register and a group of logical gates. It operates in accordance with the start pulse $\phi_S$ and reset pulse $\phi_R$ issued from the above driver circuit 17. The driver circuit issues the start pulse $\phi_S$ in response to the start signal $\phi_A$ which is externally given.

The circuit system shown in FIGS. 3A, 3B and 4 and the sensor device 1 shown in FIG. 1 can be united together to form an image scanning system in accordance with the invention.

Now, the manner of operation of such image scanning system will be described hereinafter with reference to the timing chart shown in FIG. 5.

For the purpose of explanation, description will be made of the case wherein the sensor device 1 is of CCD photo-sensor or CCD photo-diode array and wherein the image scanning system according to the invention is incorporated into an automatic range finder apparatus as disclosed in the aforementioned U.S. Pat. No. 4,004,852. Therefore, in this case, on the elements 2" remaining unshielded in the light receiving part 2 of the device 1 there are formed through a base line range finder type optical system two images in different areas of which one is an image of basic view field and the other is an image of reference view field as previously described.

Figure 5:
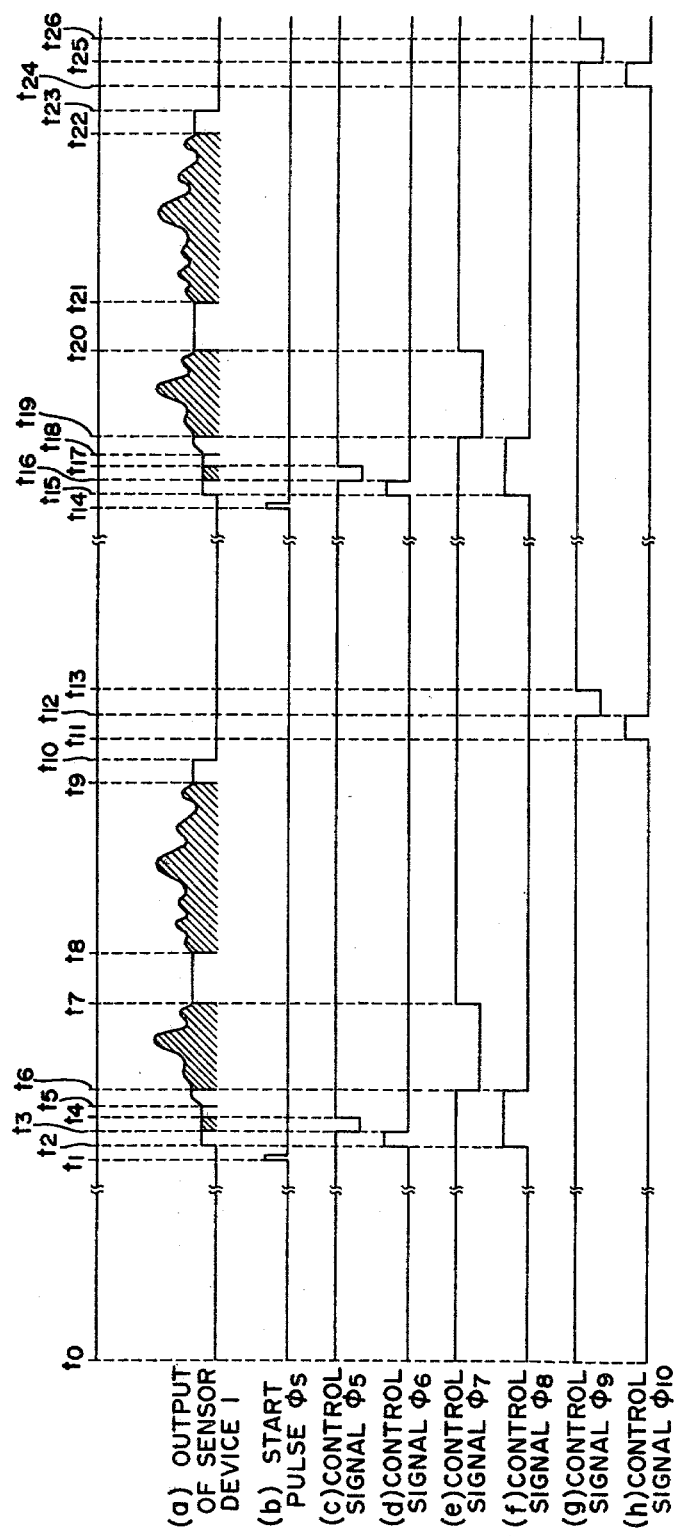
FIG. 5 is a timing chart showing wave forms of the output coming from the photo-sensor device and of various pulses and control signals issued from the circuit shown in FIG. 4.

In FIG. 5, an electric power switch not shown is thrown in the circuit at t$_o$ and thereby a voltage V$_E$ is applied to the input terminal 1a of the sensor device 1 as well as to the differential amplifier circuit 8 (FIGS. 3A and 3B). At the same time, to other circuits is applied also a voltage V'$_E$. This results in forming potential wells in the light receiving part 2 at the area under of close to the elements 2' and 2". Now, accumulation of charge is started. On the other hand, the fundamental clock generating circuit 16 starts issuing CLK (FIG. 6-(a)) that is a fundamental clock pulse which in turn makes the driver circuit 17 issue transfer clocks $\phi_1$-$\phi_4$ and reset pulse $\phi_R$ (FIG. 6-(b) to (f)) which are applied to the input terminals 1c-1g of the sensor device 1. In this position, if a start signal $\phi_A$ is given to the driver circuit 17 at a time point about t$_1$, then the driver circuit will put out a start pulse $\phi_S$ (FIG. 5-(b)) which is applied to the input terminal 1b of the sensor device 1. Now, on the sensor device 1, there are formed potential wells at the transfer gate parts 3$_1$ and 3$_2$.

Among the light receiving elements 2' and 2", a group of elements, for example, those located in odd numbers allow then the electric charge accumulated therein to be taken up by the charge transfer part 4$_1$ through the transfer gate part 3$_1$. Similarly, the electric charge accumulated in another group of elements in even numbers is taken up by the charge transfer part 4$_2$ through the transfer gate part 3$_2$.

In this manner, during the time from t$_2$ to t$_{10}$, all of the electric charges accumulated in the light receiving elements 2', 2" are transferred to the output part 5 through the charge transfer parts 4$_1$ and 4$_2$ and therefore, as shown in FIG. 5-(a), an output in a form of voltage or of current can be put out in time series from the output terminal 1i. This sensor output signal obtained from the output terminal 1i is shown in FIG. 5-(a) as a signal of wave form. But, in fact the output signal is obtained as a time series pulse signal.

The sensor output signal from the output terminal 1i is applied to the operation amplifier OP$_1$ of the differential amplifier circuit 8 at its inversion input terminal. On the other hand, to the non-inversion input terminal of the same operational amplifier OP$_1$ there is applied from the output terminal 1j a voltage variation information signal at the same time. This signal is derived from the above described voltage variation detection part 7 which detects variation in voltage within the sensor device 1 relative to the voltage V$_E$ being applied to the input terminal 1a. Therefore, the output Vop1 coming from the operational amplifier OP$_1$ is given by the following equation:

$$Vop1 = r_4/(r_3+r_4)\cdot(r_1+r_2)/r_1\cdot V_2 - (r_2/r_1)\cdot V_1$$

wherein,

V$_1$ is output of the output terminal 1i,

V$_2$ is output of the output terminal 1j, and r$_1$-r$_4$ represent resistance values of the resistances R$_1$-R$_4$ respectively.

When r$_1$=r$_2$=r$_3$=r$_4$, then

Vop1 = $V_2 - V_1$

From the above it will be understood that at the output terminal of the differential amplifier circuit 8 there appears a signal free of the voltage variation component. In this manner, variation component attributable to variation of the voltage $V_E$ can be removed from the sensor output signal.

In reading out the output of the sensor device 1, there is obtained, as an example, a signal corresponding to the electric charge accumulated in the shielded elements 2' of the light receiving part 2 during the time of from $t_2$ to $t_5$. However, during the time of from $t_2$ to $t_3$, the control signal generating circuit 18 will give the base of Tr5 of the dark current signal sampling and holding circuit 9 a control signal $\phi_6$ which is in the high level at that time as shown in FIG. 5-(d). As a result, the transistor Tr5 becomes conductive so that the charge of the condenser $C_1$ can be cleared up during this time. After the condenser charge is cleared up, the control signal generating circuit 18 applies to the base of the input control transistor Tr1, during the time of $t_3$ to $t_4$, a control signal $\phi_5$ which is in the low level as shown in FIG. 5-(c). As a result, during this time, the transistor Tr1 becomes nonconductive. Therefore, the output coming from the circuit 8 is allowed to enter the non-inversion input terminal of the comparator CP1 only during the time of the transistor Tr1 being non-conductive, namely during the time of from $t_3$ to $t_4$. The output signal actually applied to the non-inversion input terminal of the comparator CP1 during the time is therefore such signal which corresponds to the charge accumulated in those elements only which are located in the central area of the group of shielded elements 2'. Those elements are indicated by 2'a in FIG. 1. The signal is applied in a form free of voltage variation component for the reason mentioned above.

As previously described, the inversion input terminal of the comparator CP1 is connected to the condenser $C_1$. When Tr1 is conductive and the output of the circuit 8 is allowed to enter the non-inversion input terminal, the potential of the non-inversion input becomes higher than that of the inversion input. Therefore, the output of the comparator CP1 is then inverted from Low to High. Transistor Tr2 now becomes conductive and the base and collector are short-circuited. As a result, a constant current $I_{R6}$ determined by the resistance $R_6$ flows through Tr4 functioning as a diode. At the same time, Tr3 becomes conductive and charging of the condenser $C_1$ is initiated by the current $I_1$ flowing through the transistor Tr3. Assuming that the resistance value of $R_7$ is sufficiently higher than that of $R_6$ and that the base current in Tr3 is negligible, the voltage $V_{BE4}$ between base and emitter of Tr4 and the voltage $V_{BE3}$ between base and emitter of Tr3 will be given by the following equations respectively:

$$V_{BE4} = \frac{KT}{q} \ln\left(\frac{I_{R6}}{i_o} + 1\right), \text{ and}$$

$$V_{BE3} = \frac{KT}{q} \ln\left(\frac{I_1}{i_o} + 1\right)$$

wherein,
K is Boltzmann's constant,
T is absolute temperture,
q is quantum of electric charge,
io is inverse saturation current,
$I_{R6}$ is current flowing through the resistance $R_6$, and
$I_1$ is charge current of the condenser $C_1$.

For the shown embodiment of circuit, $V_{BE4} = V_{BE3}$ and, therefore, $I_{R6} = I_1$. This means that the condenser $C_1$ is charged with a constant current equal to the current flowing through $R_6$.

With rising up of the potential of $C_1$, the potential of the inversion input of CP1 rises up gradually and at last it becomes higher than the potential of the non-inversion output thereof. At the time point, the output of the comparator CP1 is inversed High to Low so that Tr2 becomes nonconductive. Then, charging of the condenser $C_1$ is stopped.

In this manner, the dark current signal sampling and holding circuit 9 can operate to sample and hold the dark current signal based upon the output signal coming from the above circuit 8 but using only such signal thereof which corresponds to the charge accumulated in the element 2'a centrally located in the group of the shielded light receiving elements 2'. The dark current informaton signal thus stored in the condenser $C_1$ is put out through the buffer amplifier BP1.

The function of the above mentioned resistance $R_7$ is to eliminate the delay is switching of the transistor Tr3 caused by junction capacitance of the diode connected transistor Tr4 when Tr2 is turned nonconductive. The delay in operation of inversion of CP1 and of Tr2 and Tr3 is constant. Therefore, assuming that charging of the condenser $C_1$ is always stopped a constant time ($t_D$) after the time point when the potential of the inversion input of the comparator CP1 exceeds that of the non-inversion input, irrespective of any variation of the output voltage from the above circuit 8, the detection error voltage $\Delta V$ caused by over-charging the condenser $C_1$ due to delay in response of the circuit system will become:

$$\Delta V = (t_D \cdot I_1 / C_q)$$

wherein, $C_q$ is capacity of the condenser $C_1$. Therefore, it is possible to obtain a voltage which correctly and accurately corresponds to the dark current signal voltage by shifting the offset voltage of CP1 or BP1 by an amount corresponding to the error voltage $\Delta V$ or by connecting a differential amplifier circuit to the output terminal of BP1 to subtract the error voltage $\Delta V$.

Again, referring to FIG. 5, during the time from $t_5$ to $t_{10}$ there is obtained a signal corresponding to the charge accumulated in the unshielded elements 2" of the light receiving part 2. This signal contains the scanning signal relating to the basic view field image and reference view field image formed on the elements 2". After the voltage variation component are removed from it, the signal is to be applied to the non-inversion input terminal of the operational amplifier OP2 of the next circuit, that is, the differential amplifier circuit 10. However, at this time, to the inversion input terminal of the same operational amplifier OP2 on the other hand there is applied the dark current information signal sampled and held by the above circuit 9 during the time of from $t_3$ to $t_4$. Therefore, like the above mentioned output Vop1 of the operational amplifier OP1 in the circuit 8, the output VoP2 of the operational amplifier OP2 is given by:

$$Vop2 = r_9/(r_8 + r_9) \cdot r_{10} + r_{11}/r_{10} \cdot Vop1 - (r_{11}/r_{10}) \cdot V_{BP1}$$

wherein, $V_{BP1}$ is output from the dark current signal sampling and holding circuit 9, and $r_8-r_{11}$ are resistance values of the resistances $R_8-R_{11}$ respectively. Let $r_8=r_9=r_{10}=r_{11}$, then $Vop2=Vop1-V_{BP1}$.

Thus, at the output terminal of the differential amplifier circuit 10 there appears a signal from which the dark current component has already been excluded. In this manner, it is possible to further exclude the dark current component from the sensor output signal.

The output coming from the above circuit 10 is then applied to the filter circuit 11 to remove further any high frequency noise component from it. After removal of the high frequency noise component, the output signal is applied to the binary coding circuit 15 and to the peak detection circuit 12.

In the peak detection circuit 12, there is given a control signal $\phi_8$ to the base of transistor Tr10 by the control signal generating circuit 18 during the time of from $t_2$ to $t_6$ as shown in FIG. 5-(f). Since the control signal $\phi_8$ is a High level signal, Tr10 is conductive during the time and the charge in the condenser $C_3$ is cleared up. After clearance of the charge, the control signal generating circuit 18 gives the base of input control transistor Tr6 a Low level control signal $\phi_7$ during the time of $t_6$ to $t_7$ so that Tr6 becomes nonconductive during the time. Therefore, among the outputs coming from the above filter circuit 11 only such output as issued therefrom during the time of $t_6$ to $t_7$, namely during the time of Tr6 being nonconductive is allowed to come into the non-inversion input terminal of the comparator $CP_2$. As will be understood from FIG. 5-(a) this output corresponds to the basic view field image formed on the unshielded elements 2''. The remaining output obtained during the time of $t_5$ to $t_6$ corresponds to the signal derived from those elements lying near the basic view field image and therefore it is not a scanning signal of the basic view field image. In this manner, by turning down the control signal $\phi_7$ from High to Low at the time point $t_6$ it is assured that the comparator $CP_2$ receives only such signal which accurately corresponds to the basic view field image.

As described above, at the time point $t_6$ the comparator $CP_2$ receives at its non-inversion input terminal from the above filter circuit 11 a scanning output of the basic view field image which no longer contains any voltage variation component, dark current component and high frequency noise component. Like $CP_1$ in the circuit 9, the inversion input terminal of the comparator $CP_2$ is connected to condenser $C_3$. Therefore, upon the time when the above mentioned output of the filter circuit 11 is applied to the non-inversion input terminal of the comparator $CP_2$, the output thereof is inverted from Low to High. This makes transistors Tr7 and Tr8 conductive so that charging of the condenser $C_3$ is started with a constant current equal to the current flowing through the resistance $R_{14}$ in the same manner as in the case of the above described circuit 9. When the charge voltage on $C_3$ exceeds the output voltage from the filter circuit 11, the output of $CP_2$ is again inverted from High to Low to stop charging of the condenser $C_3$. The above described operation of starting and stopping charging of the condenser $C_3$ depending upon the variation of output from the filter circuit 11 is repeated up to the end of time $t_7$ in the peak detection circuit 12. Finally, when $t_7$ has passed, transistor Tr6 is turned conductive so that delivery of the output from the filter circuit 11 to the non-inversion input terminal of $CP_2$ is cut off. At this time point, there remains stored in the condenser $C_3$ the maximum value among the outputs put out from the filter circuit 11 during the time of $t_6$ to $t_7$. This maximum value is a voltage corresponding to the peak of the scanning output relating to the basic view field image. In this manner, the peak of the scanning output signal relating to the basic view field image can be detected.

With the advance of the operation time to $t_8$, $t_9$ and $t_{10}$, the scanning signals obtained during the time are successively applied to the binary coding circuit 15 after the voltage variation component, dark current component and high frequency noise component are removed in the circuits 8, 10 and 11 respectively in the same manner as described above. Like the signals obtained during the time of $t_5$ to $t_6$, those signals as obtained during the time of $t_7$ to $t_8$ and during the time of $t_9$ to $t_{10}$ among all the signals during the time of from $t_7$ to $t_{10}$ are not related to the view field image. The scanning signals related to the reference view field image are only those which are obtained during the time of $t_8$ to $t_9$.

After $t_{10}$ has passed and reading out the output of the sensor device has been finished, a control signal $\phi_{10}$ is applied to the base of transistor Tr15 in the peak value holding circuit 13 from the control signal generating circuit 18 at the beginning of $t_{11}$. As shown in FIG. 5-(h), the control signal $\phi_{10}$ is in High level during the time of from $t_{11}$ to $t_{12}$. Therefore, during the time, Tr15 becomes conductive so that the charge on $C_4$ is cleared up. After the clearance of charge of the condenser $C_4$, there is applied to the base of input control transistor Tr11 from the control signal generating circuit 18 a control signal $\phi_9$ which becomes low during the time of from $t_{12}$ to $t_{13}$ as shown in FIG. 5-(g). As a result Tr11 is non-conductive during the time and the output coming out from the above peak detection circuit 12 is allowed to come into the non-inversion input terminal of the comparator $CP_3$. Thus, in a manner as previously described in connection with the dark current signal sampling and holding circuit 9 and the peak detection circuit 12, the condenser is charged up to a level corresponding to the potential of non-inversion input of the comparator $CP_3$. The result is that a voltage corresponding to the peak value of scanning output signal relating to the basic view field image detected by the above circuit 12 is stored in the condenser $C_4$. The voltage stored in $C_4$ is then applied to the voltage divider circuit 14 as a peak voltage Vp through buffer amplifier $BP_3$. At the output terminal of the voltage divider circuit 14 there appears a voltage Vs which can be represented by:

$$Vs = \frac{\frac{Vp}{r_{19}}}{\frac{1}{r_{19}}+\frac{1}{r_{20}}+\frac{1}{vr}}$$

wherein, $r_{19}$ and $r_{20}$ are resistance values of resistances $R_{19}$ and $R_{20}$ respectively, and vr is resistance value of variable resistance VR. This output constitutes a slice level for binary coding of signal and is applied to the inversion input terminal of the comparator $CP_4$ in the binary coding circuit 15.

In order to obtain the desired binary coded data with high accuracy and without influence by noise signal in the circuit system it is preferable to set the voltage Vs serving as a slice level to a value in the order of Vs=0.6 Vp to 0.8 Vp (Vp is the above mentioned peak voltage).

In the above described position of operation and at a time point, for example, about $t_{14}$, start signal $\phi_A$ may be given to the driver circuit 17 again. By doing so, the driver circuit issues again a start pulse $\phi_s$ to initiate again reading out the output of the sensor device. Scanning output signal obtained this time is applied to the non-inversion input terminal of the comparator $CP_4$ in the binary coding circuit 15 after the voltage variation component, dark current component and high frequency noise component being removed through the circuits 8, 10 and 11 in the same manner as described above. Thus, by the comparator $CP_4$, a binary coding of the scanning signal is effected using the slice level of Vs set based upon the peak voltage Vp detected the last time.

In reading out the output of the sensor device this time, sampling and holding the dark current signal by the circuit 9 is effected during the time of from $t_{16}$ to $t_{17}$ and the dark current component detected thereby is then removed in the differential amplifier circuit 10. During the time of $t_{19}$ to $t_{20}$ there is carried out the detection of peak value again by the circuit 12 and at $t_{23}$ the reading out of output of the sensor device comes to end. At $t_{24}$, the peak voltage Vp stored in the circuit 13 is cleared up and at $t_{25}$ the peak value is rewritten by a new peak value detected by the circuit 12 during the time of from $t_{19}$ to $t_{20}$. The output voltage Vs obtained this time from the voltage divider circuit becomes a slice level for binary coding of scanning signal to be obtained by the next reading of sensor device output.

The operation described above is repeated thereafter whenever a new start signal $\phi_A$ is applied to the driver circuit 17. Thus, from the binary coding circuit 15 there are obtained, with high accuracy, binary coded data related to the basic view field image and the reference view field image optically formed on the sensor device 1.

Now, a detailed description will be made of the above mentioned control signal generating circuit 18. The example of control signal generating circuit to be described hereinafter is of the simpliest form and is composed of shift register and logic gate group.

Figure 7:
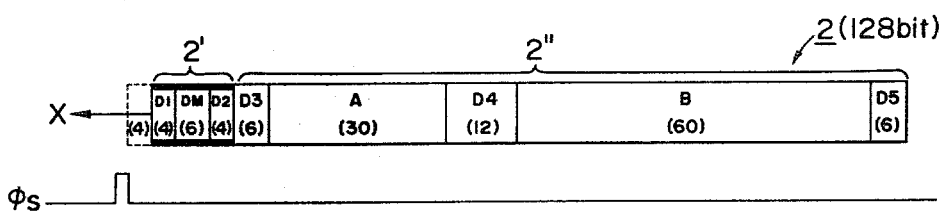
FIG. 7 illustrates the manner of setting of picture element areas on the light receiving part of the photo-sensor device.

For the sake of explanation, the following assumption is set as for the composition of sensor device 1:

As illustrated in FIG. 7, the sensor device 1 is of composition of 128 bits. In other words, the light receiving part 2 comprises 128 elements. Of these 128 light receiving elements, 14 elements at the side close to the output part, namely at the left hand side as viewed in the drawing are used as shielded elements 2'. But, among the shielded elements 2', the left end area $D_1$ covering 4 (four) bits and the right end area $D_2$ covering 4 bits are blocking areas, and the central area DM covering 6 bits is used for detection of dark current. The area covering 6 bits designated by D3 is a dummy area. The next area covering 30 bits generally designated by A is an area for receiving the basic view field image and the area B covering 60 bits is that for receiving the reference view field image. The area D4 covering 12 bits between the areas A and B is used as an image separation area. The last area covering 6 bits designated by D5 is also a dummy area.

The time from the application of a start pulse $\phi_s$ to the sensor device 1 to the actual start of output is assumed to be equal to the time required to drive four bits as suggested by a broken line in FIG. 7.

As the control pulse $\phi_{10}$ to be applied to the storage value clearing transistor Tr15 in the peak value holding circuit 13, there is used such signal which changes from Low to High after the elapse of a four bit driving time following to the end of output from the device 1 and returns to High from Low after the elapse of a further six bit driving time.

Similarly, as the control signal $\phi_9$ to be applied to the input control transistor Tr11 there is used a signal the level of which changes from High to Low at the time of the above control signal $\phi_{10}$ being returned to Low from High and returns to High from Low after the lapse of time necessary to drive six bits following the first change of the level.

The arrow X shown in FIG. 7 indicates a direction in which the output of the sensor device is read out.

Figure 8:
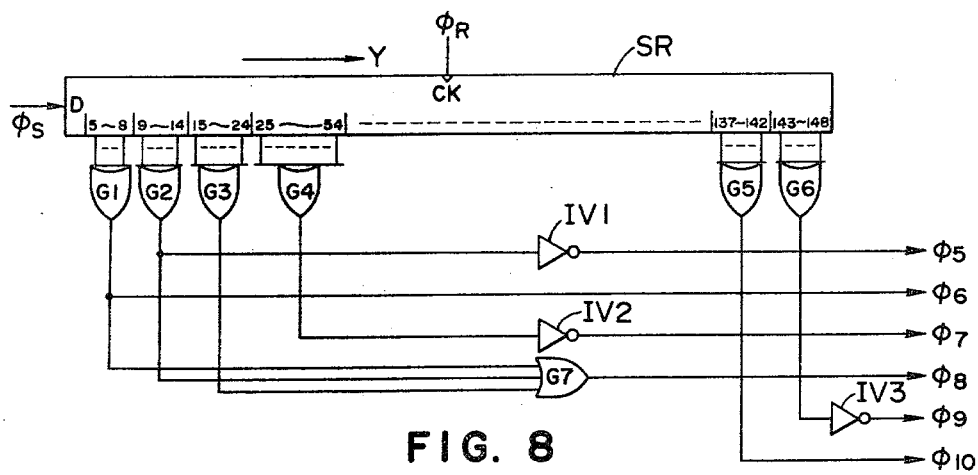
FIG. 8 is a logic circuit diagram showing an example of control signal generating circuit as shown in FIG. 4 and adapted for the photo-sensor device shown in FIG. 7.

On the above described assumption, the control signal generating circuit 18 can be formed most simply as illustrated in FIG. 8.

In FIG. 8, designated by SR is a shift register of 148 bit, input in series-output in parallel type. The shift register receives, at its data input terminal D, start pulse $\phi_s$ and at its clock input terminal CK, reset pulse $\phi_R$ from the driver circuit 17. G1 to G7 are OR-gates of which G1 is provided for making a logical sum of outputs from the fifth to eighth bits. Similarly, G2 is for the 9th to 14th of bits, G3 is for the 15th to 24th, G4 is for the 25th to 54th, G5 is for the 137th to 142th and G6 is for the 143th to 148th of bits. G7 is used for making a logical sum of outputs coming G1 to G3. The circuit 18 further comprises three inverters IV1, IV2 and IV3 to put out the outputs of G2, G5 and G7 in an inversed logical form respectively.

The manner of operation of the control signal generating circuit 18 with the above described arrangement is as follows:

In the position of the circuit in which a reset pulse $\phi_R$ is being applied to the clock input terminal CK of the shift register SR from the driver circuit 17, a start pulse $\phi_s$ is issued from the driver circuit in response to a start signal $\phi_A$ externally given. Then, the data input of the shift register SR will become "1" and when a reset pulse $\phi_R$ is applied during the time of the start pulse $\phi_s$ being in High level as shown in FIG. 6, the "1" will be stored in the first bit of the shift register SR. Since, as seen in FIG. 6, the start pulse $\phi_s$ returns to Low to High in timing with the change of the reset pulse $\phi_R$ from High to Low, the data input of the register SR remains "0" after that. Therefore, the stored data "1" is shifted bit by bit in the direction of arrow Y every time when reset pulse $\phi_R$ is applied. In this step of shifting the stored data "1" in response to the reset pulse $\phi_R$, the data enters the section of from the fifth bit to the eight one. During the time at which the data "1" is in any bit of the section, the output of OR-gate G1 is High. As will be understood from FIG. 7, the time period during which the output of G1 is High corresponds to the time period during which the output of the shielded blocking area D1 is being read out. Therefore, this output coming from the OR-gate G1 is the control signal $\phi_6$ (FIG. 5-(d)) to be applied to transistor Tr5 in the dark current sampling and holding circuit 9.

The data "1" is further advanced in the shift register SR and comes into the section of from the 9th bit to the 14th bit. During the time of the data being in any bit of the section, the output of G2 is High. Since the time period during which this OR-gate G2 issues the high output corresponds to the time period during which the output coming from the dark current detection area DM of the light receiving part 2 is being read out, the inversed output of the inverter IV1 derived from this output of the gate G2 constitutes the control signal $\phi_5$ (FIG. 5-(c)) to be applied to the input control transistor Tr1 in the circuit 9.

On the other hand, during the time period at which the stored data "1" is in any one of the bit group consisting of bits from the 5th bit to 24th bit, any one of outputs coming from gates G1–G3 is High. Therefore, during this time period the output of the gate G7 is also High. As seen from FIG. 7, this time period just corresponds to the time period during which reading-out of output is effected for the areas D1, DM, D2 and D3 covering 20 bits in total in the light receiving part 2. Therefore, this output of G7 is the control signal $\phi_8$ (FIG. 5-(f)) for the storage value clearing transistor Tr10 in the peak detection circuit 12.

The stored data "1" is further advanced in the shift register SR and comes into the section of from the 25th bit to the 54th one. During the time period of the data being in this section, the output of OR-gate G4 is High. This time period just corresponds to the time period of reading out the output coming from the basic view field image area A covering 30 bits in the light receiving part 2. Therefore, the inversed output of the inverter IV2 derived from the output of the gate G4 is the control signal $\phi_7$ (FIG. 5-(e)) to be applied to the input control transistor Tr6 of the peak detection circuit 12.

The data "1" is further advanced in the shift register SR and when it comes into the 132th bit, the readout of output of the sensor device 1 is completed all over. A driving time of more 4 bits after, the data "1" will be stored in the 137th bit. During the time period of the data being further shifted up to the 143th bit, the output of the gate G5 is High and therefore it becomes the control signal $\phi_{10}$ (FIG. 5-(h)) to be applied to transistor Tr15 of the peak value holding circuit 13. During the next period of data shift from the 143th bit to the end position at which the stored data is discharged from the shift register SR, the output of the gate G6 is High. Since the gate G6 is connected to the inverter IV3, this output of the gate G6 inverted by the inverter constitutes the control signal $\phi_9$ (FIG. -(g)) to be applied to the input control transistor Tr11 in the circuit 13.

In this manner, all the control signals $\phi_5$–$\phi_{10}$ necessary for the dark current signal sampling and holding circuit 9, peak detection circuit 12 and peak value holding circuit 13 are obtainable from the control signal generating circuit 18 shown in FIG. 8.

As will be well understood from the foregoing, the combination of the sensor device shown in FIG. 1 and the circuit shown in FIGS. 3 and 4 in accordances with the invention brings forth various advantages.

When the combination is used for scanning of object images, it enables exclusion of the voltage variation component, dark current and high frequency noise component from the produced scanning signal and permits a scanning output signal to be obtained precisely corresponding to the image pattern of the object. Furthermore, it is possible to obtain from the scanning output signal binary coded data of the object image with high accuracy.

According to the present invention, a signal informing of dark current in the light receiving part can be obtained in a simple and reliable manner only by shielding the portion of the part against light by suitable shielding means. This requires only a slight modification of the known and common photo-sensor device. By subtracting the electrical signal derived from the shielded portion from the electrical signal derived from the unshielded portion of the light receiving part using a suitable circuit, any undesirable dark current component can be removed from the signal. Thus, it is now possible to produce a photo-electric signal correctly and precisely corresponding to the brightness distribution of light then incident upon a light receiving part.

The improved photo-sensor device according to the invention is applicable to an image scanning system with many advantages. As previously described in detail in connection with an embodiment thereof, harmful noise components inevitably contained in the output signal can be removed effectively by providing a dark current signal sampling and holding circuit in the system so as to exclude the dark current component in the manner mentioned above. Therefore, also, in an image scanning system, there is obtained a scanning output signal precisely corresponding the pattern of image and free of disturbing noise signal components in accordance with the principle of the invention. The principle of the invention is applicable, for example, for automatic range finder apparatus, automatic focus detection apparatus or automatic focus adjusting apparatus of the type using photo-sensor device with many advantages such as improved accuracy in finding range of detecting focus.

According to another feature of the invention, the problem of variation of sensor device output level caused by variation of voltage applied to the devices can be solved by providing a voltage variation detection part for the above mentioned photosensor device. The detection part is so formed as to detect the voltage variation within the device relative to the variation of voltage applied to the device and then produce an electrical output signal informing of the detected voltage variation. Using this output signal, any undesirable voltage variation component can be removed in a reliable manner. Thus, the present invention enables a photoelectric signal to be obtained correctly and precisely corresponding to the brightness distribution of light then incident upon a light receiving part and containing no voltage variation component.

This feature of the invention is also applicable for an image scanning system by providing a voltage variation component eliminating circuit as described above in detail. There can be obtained always correct scanning output signals irrespective of variation in voltage applied to the sensor device.

As shown and described above with reference to an embodiment thereof, the above described two features, that is, means for eliminating dark current component and means for eliminating voltage variation component can be used together in one system as a combination. By doing so, a complete elimination of various noise signals can be attained in accordance with the invention and a photo-electric signal correctly corresponding to the brightness distribution of light then incident upon a sensor device can be obtained in a much more purified form and with higher accuracy.

In connection with the preferred embodiment discribed above, note should be taken to the following points:

Referring to FIGS. 7 and 8 it has been described that the shielded element portion 2' comprises dummy or blocking area D1 and D2 located at the both ends of the portion 2' and a dark current detection area DM (2'a in FIG. 1). This arrangement has the advantage that the blocking areas D1 and D2 prevent light from coming into the shielded dark current detection area DM located therebetween from the side of end surface of the shielding layer 6 and from the opposite side of unshielded elements 2" adjacent to the shielded element 2'. Therefore, introduction of noise electric charge caused by such intruded light can be prevented and the middle dark current detection area DM can serve to produce a signal indicative of a true dark current present at that time.

Theoretically, the number of the shielded elements 2' may be three in total, one for the dark current detection area DM and two for the two blocking areas D1 and D2. In practice, however, considering the problem of signal level and the signal processing in the after-connected circuits, it is advisable to use two or more elements in each of the areas D1, D2 and DM as in the case of the shown embodiment. That is true in particular for the case wherein the electric charges accumulated in the light receiving part 2 are divided into two groups, namely, a first group of elements in odd numbers and a second group of even numbered elements and they are transferred separately through separate CCD channels (charge transfer parts $4_1$ and $4_2$) as in the case of FIG. 1 embodiment. In this case, variation of dark current occurred in one channel and that in another are not always equal to each other. Therefore, it is preferable for the dark current detection area to comprise two or more continuous elements.

It is also preferable to appoint such elements to the dark current detection area DM the output of which is to be read out relatively early in the step of output reading out. As will be understood from the above described embodiment, this has a remarkable advantage in view of signal processing. But, if necessary, the dark current detection area may be located in the middle or end portion of the light receiving element array.

While the invention has been particularly shown and described with reference to preferred embodiments thereof, it will be understood by those skilled in the art that the foregoing and other changes in form and details can be made without departing from the spirit and scope of the invention.

For example, the application of the present invention is not limited only to the line type photo-sensor device shown in the embodiment but it is equally applicable to an area type photo-sensor device. Also, in the combination of the photo-sensor device shown in FIG. 1 and the circuits 8, 12 and 10 shown in FIG. 3A, these circuits may be formed integrally with the sensor device as that of so-called on-chip structure. In this case, as the circuits 8, 9 and 10 there are used those of CMOS structure and as the memory condenser $C_1$ in the dark current sampling and holding circuit 9 there is used an electrostatic capacity formed at the junction between silicon semiconductor and printed pattern or its equivalent.

What we claim is:

1. A radiation sensing device comprising:
   (a) radiation sensing means having a plurality of radiation sensitive elements, each for providing an electrical signal corresponding to received radiation, said plurality of radiation sensitive elements in said radiation sensing means being arranged in array;
   (b) optically opaque means for shielding a portion of said radiation sensing means so that an electrical signal indicative of a dark current is provided by one or more radiation sensitive elements shielded by said opaque means, said optically opaque means shielding at least one radiation sensitive element located at or near the end of said array;
   (c) time-seriation output means for emitting in seriatim electrical signals provided by said radiation sensitive elements in order of arrangement of said elements in the array;
   (d) means for receiving a bias voltage to be supplied to said device; and
   (e) means electrically coupled with said bias voltage receiving means so as to provide an electrical signal informing of internal voltage variation in said device relative to variation of said bias voltage, wherein said optically opaque means is disposed to shield one or more such radiation sensitive elements the electrical signals of which are to be put out by said time-seriation output means relatively early in the output sequence, and said radiation sensing means, said time-seriation output means, said bias voltage receiving means and said internal voltage variation information providing means are formed on or in the same semiconductive substrate.

2. A radiation sensing device according to claim 1, wherein said internal voltage variation information providing means includes a field effect transistor having source, gate and drain electrodes for producing the electrical signal information of internal voltage variation through the source electrode wherein the drain electrode is electrically coupled to said bias voltage receiving means, and the gate electrode is constructed such that a potential variable in accordance with the internal voltage variation in the sensing device is applied to the gate electrode.

3. An image scanning system comprising:
   (A) a radiation sensing device arranged to receive an image, said device having;
      (a) radiation sensitive means for providing electrical signals corresponding to received radiations;
      (b) means for providing an electrical signal indicative of a dark current of the sensing device;
      (c) means for receiving a bias voltage to be supplied to said device; and
      (d) means electrically coupled with said bias voltage receiving means so as to provide an electrical signal informing of internal voltage variation in said device relative to variation of said bias voltage, wherein said internal voltage variation information providing means includes a field effect transistor having source, gate and drain electrode for producing the electrical signal information of internal voltage variation through the source electrode wherein the drain electrode is electrically coupled to said bias voltage receiving means, and the gate electrode is constructed such that a potential variable in accordance with the internal voltage variation in the sensing device is applied to the gate electrode; and
   (B) circuit means electrically coupled to said sensing device for compensating for the electrical signals provided by said radiation sensitive means with the electrical signal provided by said internal voltage variation information providing means and the dark current signal provided by said dark current signal providing means.

4. An image scanning system according to claim 3, wherein said circuit means includes:
   a first circuit for compensating for the electrical signals provided by said radiation sensitive means with the electrical signal provided by said internal voltage variation information providing means; and a second circuit for compensating for the electrical signals provided by said radiation sensitive means with the dark current signal provided by said dark current signal providing means.

5. An image scanning system according to claim 3, wherein said circuit means includes;

a first circuit for compensating for the electrical signals provided by said radiation sensitive means and the dark current signal provided by said dark current signal providing means with the electrical signal provided by said internal voltage variation information providing means; and a second circuit for compensating for the electrical signals compensated by said first circuit and related to the radiation sensitive means with the dark current signal compensated by the first circuit and related to the dark current signal providing means.

6. An image scanning system comprising:
(a) a radiation sensing device arranged to receive an image, said sensing device including:
  (i) An array of a plurality of radiation sensitive elements, each for providing an electrical signal indicative of received portion of said image;
  (ii) Optically opaque means for shielding a portion of said array so that an electrical signal indicative of a dark current is provided by one or more radiation sensitive elements shielded by said opaque means;
  (iii) time-seriation output means for emitting in seriatim electrical signals provided by said radiation sensitive elements in order of arrangement of said elements in the array; and
  (iv) output terminal means for leading out the electrical signals provided by said radiation sensitive elements to the exterior of said sensing device; and
(b) means coupled to said output terminal means of said sensing device to subtract the electrical signal provided by said one or more radiation sensitive elements shielded by said opaque means from the electrical signals provided by unshielded radiation sensitive elements, wherein said array of radiation sensitive elements, said time-seriation output means and at least a portion of said subtract means are formed on or in the same semi-conductive substrate, said sensing device further comprising:
means for receiving a bias voltage to be supplied to the sensing device;
detection means electrically coupled to said bias voltage receiving means for detecting internal voltage variation in the sensing device relative to variation of said bias voltage and producing a detection signal to indicate the variation of the internal voltage; and
second output terminal means for leading out the detection signal provided by said detection means to the exterior of said sensing device;
and wherein said image scanning system further comprises:
means coupled to both of said output terminal means of the sensing device to compensate for the electrical signals provided by the radiation sensitive elements with the detection signal provided by said detection means, wherein said bias voltage receiving means, said detection means and at least a portion of said compensation means are formed on or in said semi-conductive substrate.

7. An image scanning system according to claim 6, wherein said subtracting means is coupled to said compensation means to receive the compensated electrical signals by said compensation means.

8. An image scanning system according to claim 6, wherein said subtracting means includes:
a circuit coupled to the output terminal means of said sensing device to sample and hold the electrical signal provided by said one or more radiation sensitive elements shielded by said opaque means; and
a circuit coupled to the output terminal means and said sampling and holding circuit to subtract the electrical signal sampled and held by said sampling and holding circuit from the electrical signals provided by the unshielded radiation sensitive elements, wherein at least a portion of said sampling and holding circuit and at least a portion of said subtract circuit are formed on or in said semi-conductive substrate.

9. An image scanning system according to claim 8, which further comprises control means coupled to said sampling and holding circuit for controlling said circuit so that only the electrical signal provided by said one or more radiation sensitive elements shielded by said opaque may be sampled and held by said sampling and holding circuit.

10. An image scanning system according to claim 9, which further comprises driving means coupled to said sensing device for supplying timing signals to said device to drive the same and wherein said control means is coupled to said driving means and controls said sampling and holding circuit relying upon the timing signals coming from said driving means.

11. An image scanning system according to claim 6, wherein said detection means includes a field effect transistor having source, gate and drain electrodes for producing the detection signal indicative of the internal voltage variation through the source electrode wherein the drain electrode is electrically coupled to said bias voltage receiving means, and the gate electrode is constructed such that a potential variable in accordance with the internal voltage variation in the sensing device is applied to the gate electrode.

12. An image scanning system comprising:
(a) a radiation sensing device arranged to receive an image, said sensing device including:
  (i) an array of a plurality of radiation sensitive elements, each for providing an electrical signal indicative of received portion of said image;
  (ii) optically opaque means for shielding a portion of said array so that an electrical signal indicative of a dark current is provided by one or more radiation sensitive elements shielded by said opaque means;
  (iii) time-seriation output means for emitting in seriatim electrical signals provided by said radiation sensitive elements in order of arrangement of said elements in the array; and
  (iv) output terminal means for leading out the electrical signals provided by said radiation sensitive elements to the exterior of said sensing device; and
(b) means coupled to said output terminal means of said sensing device to subtract the electrical signal provided by said one or more radiation sensitive elements shielded by said opaque means from the electrical signals provided by unshielded radiation sensitive elements, said subtracting means including:

a circuit coupled to the output terminal means of said sensing device to sample and hold the electrical signal provided by said one or more radiation sensitive elements shielded by said opaque means; and a circuit coupled to the output terminal means and said sampling and holding circuit to subtract the electrical signal sampled and held by said sampling and holding circuit from the electrical signals provided by the unshielded radiation sensitive elements, wherein at least a portion of said sampling and holding circuit and at least a portion of said subtract circuit are formed on or in said-semi-conductive substrate, and wherein said array of radiation sensitive elements, said time-seriation output means at least a portion of said subtract means are formed on or in the same semi-conductive substrate, said sampling and holding circuit including:

a capacitor adapted for holding an electrical signal corresponding to the electrical signal provided by said one or more radiation sensitive elements shielded by said opaque means;

a charging circuit coupled to said capacitor for charging the capacitor with a constant current;

a charge control circuit for controlling the charging of said capacitor with said constant current on the basis of the electrical signal provided by said one or more radiation sensitive elements shielded by the opaque means, said charge control circuit being coupled to said output terminal means and to said charging circuit; and an output circuit coupled to said capacitor for putting out the electrical signal held by the capacitor as the electrical signal provided by said one or more radiation sensitive elements shielded by the opaque means;

said subtract circuit being coupled to said output circuit and subtract the electrical signal provided through the output circuit from the electrical signals provided by the unshielded radiation sensitive elements.

13. An image scanning system comprising:

(a) a radiation sensing device arranged to receive an image, said sensing device including:

(i) an array of a plurality of radiation sensitive elements, each for providing an electrical signal indicative of received portion of said image;

(ii) optically opaque means for shielding a portion of said array so that an electrical signal indicative of a dark current is provided by one or more radiation sensitive elements shielded by said opaque means;

(iii) time-seriation output means for emitting in seriatim electrical signals provided by said radiation sensitive elements in order of arrangement of said elements in the array; and (iv) output terminal means for leading out the electrical signals provided by said radiation sensitive elements to the exterior of said sensing device; and (b) means coupled to said output terminal means of said sensing device for subtracting the electrical signal provided by said one or more radiation sensitive elements shielded by said opaque means from the electrical signals provided by unshielded radiation sensitive elements, wherein, said subtracting means includes:

a circuit coupled to the output terminal means of said sensing device to sample and hold the electrical signal provided by said one or more radiation sensitive elements shielded by said opaque means; and a circuit coupled to the output terminal means and said sampling and holding circuit to subtract the electrical signal sampled and held by said sampling and holding circuit from the electrical signals provided by the unshielded radiation sensitive elements, and wherein said sampling and holding circuit includes:

a capacitor adapted for holding an electrical signal corresponding to the electrical signal provided by said one or more radiation sensitive elements shielded by said opaque means;

a charging circuit coupled to said capacitor for charging the capacitor with a constant current;

a charge control circuit for controlling the charging of said capacitor with said constant current on the basis of the electrical signal provided by said one or more radiation sensitive elements shielded by the opaque means, said charge control circuit being coupled to said output terminal means and to said charging circuit; and an output circuit coupled to said capacitor for putting out the electrical signal held by the capacitor as the electrical signal provided by said one or more radiation sensitive elements shielded by the opaque means;

said subtract circuit being coupled to said output circuit and subtract the electrical signal provided through the output circuit from the electrical signals provided by the unshielded radiation sensitive elements;

means for receiving a bias voltage to be supplied to the sensing device;

detection means electrically coupled to said bias voltage receiving means for detecting internal voltage variation in the sensing device relative to variation of said bias voltage and producing a detection signal to indicate the variation of the internal voltage; and second output terminal means for leading out the detection signal provided by said detection means to the exterior of said sensing device;

and wherein said image scanning system further comprises:

means coupled to both of said output terminal means of the sensing device to compensate for the electrical signals provided by the radiation sensitive elements with the detection signal provided by said detection means, and wherein said detection means includes:

a field effect transistor having source, gate and drain electrodes for producing the detection signal indicative of the internal voltage variation through the source electrode wherein the drain electrode is electrically coupled to said bias voltage receiving means, and the gate electrode is constructed such that a potential variable in accordance with the internal voltage variation in the sensing device is applied to the gate electrode.

14. An image scanning system according to claim 13 which further comprises control means coupled to said sampling and holding circuit for controlling said circuit so that only the electrical signal provided by said one or more radiation sensitive elements shielded by said opaque means may be sampled and held by said sampling and holding circuit.

15. An image scanning system according to claim 14, which further comprises driving means coupled to said sensing device for supplying timing signals to said device to drive the same and wherein said control means is coupled to said driving means and controls said sampling and holding circuit relying upon the timing signals coming from said driving means.

16. An image scanning system according to claim 13 wherein said subtracting means is coupled to said compensation means to receive the compensated electrical signals by said compensation means.

17. A radiation sensing device comprising:
  (a) radiation sensitive means for providing electrical signals corresponding to received radiations;
  (b) means for providing an electrical signal indicative of a dark current of the sensing device;
  (c) means for receiving a bias voltage to be supplied to said device; and
  (d) means electrically coupled with said bias voltage receiving means so as to provide an electrical signal informing of internal voltage variation in said device relative to variation of said bias voltage,
wherein said radiation sensitive means, said dark current signal providing means, said bias voltage receiving means and said internal voltage variation information providing means are formed on or in the same semi-conductive substrate.

18. A radiation sensing device according to claim 17, wherein said internal voltage variation information providing means includes a field effect transistor having source, gate and drain electrode for producing the electrical signal information of internal voltage variation through the source electrode wherein the drain electrode is electrically coupled to said bias voltage receiving means, and the gate electrode is constructed such that a potential variable in accordance with the internal voltage variation in the sensing device is applied to the gate electrode.

19. A radiation sensing device comprising:
  (a) radiation sensitive means for providing electrical signals corresponding to received radiations;
  (b) means for providing an electrical signal indicative of a dark current of the sensing device;
  (c) means for receiving a bias voltage to be supplied to said device; and
  (d) means electrically coupled with said bias voltage receiving means so as to provide an electrical signal informing of internal voltage variation in said device relative to variation of said bias voltage,
wherein said internal voltage variation information providing means includes a field effect transistor having source, gate and drain electrode for producing the electrical signal information of internal voltage variation through the source electrode wherein the drain electrode is electrically coupled to said bias voltage receiving means, and the gate electrode is constructed such that a potential variable in accordance with the internal voltage variation in the sensing device is applied to the gate electrode.

20. An image scanning system comprising:
  (A) a radiation sensing device arranged to receive an image, said device having;
    (a) radiation sensitive means for providing electrical signals corresponding to received radiations;
    (b) means for providing an electrical signal indicative of a dark current of the sensing device;
    (c) means for receiving a bias voltage to be supplied to said device; and
    (d) means electrically coupled with said bias voltage receiving means so as to provide an electrical signal informing of internal voltage variation in said device relative to variation of said bias voltage,
  wherein said radiation sensitive means, said dark current signal providing means, said bias voltage receiving means and said internal voltage variation information providing means are formed on or in the same semi-conductive substrate; and
  (B) circuit means electrically coupled to said sensing device for compensating for the electrical signals provided by said radiation sensitive means with the electrical signal provided by said internal voltage variation information providing means and the dark current signal provided by said dark current signal providing means.

21. An image scanning system according to claim 20, wherein at least a portion of said circuit means is formed on or in said semi-conductive substrate.

22. An image scanning system according to claims 20 or 21, wherein said circuit means includes:
  a first circuit for compensating for the electrical signals provided by said radiation sensitive means with the electrical signal provided by said internal voltage variation information providing means; and
  a second circuit for compensating for the electrical signals provided by said radiation sensitive means with the dark current signal provided by said dark current signal providing means.

23. An image scanning system according to claims 20 or 21, wherein said circuit means includes;
  a first circuit for compensating for the electrical signals provided by said radiation sensitive means and the dark current signal provided by said dark current signal providing means with the electrical signal provided by said internal voltage variation information providing means; and
  a second circuit for compensating for the electrical signals compensated by the first circuit and related to the radiation sensitive means with the dark current signal compensated by the first circuit and related to the dark current signal providing means.

24. An image scanning system according to claim 20, wherein said internal voltage variation information providing means includes a field effect transistor having source, gate and drain electrode for producing the electrical signal information of internal voltage variation through the source electrode wherein the drain electrode is electrically coupled to said bias voltage receiving means, and the gate electrode is constructed such that a potential variable in accordance with the internal voltage variation in the sensing device is applied to the gate electrode.

25. A radiation sensing device comprising:

(a) radiation sensing means having a plurality of radiation sensitive elements, each for providing an electrical signal corresponding to received radiation, said plurality of radiation sensitive elements in said radiation sensing means being arranged in array;

(b) optically opaque means for shielding a portion of said radiation sensing means so that an electrical signal indicative of a dark current is provided by one or more radiation sensitive elements shielded by said opaque means, said optically opaque means shielding at least one radiation sensitive element located at or near the end of said array;

(c) time-seriation output means for emitting in seriatim electrical signals provided by said radiation sensitive elements in order of arrangement of said elements in the array;

(d) means for receiving a bias voltage to be supplied to said device; and (e) means electrically coupled with said bias voltage receiving means so as to provide an electrical signal informing of internal voltage variation in said device relative to variation of said bias voltage, wherein said optically opaque means is disposed to shield one or more such radiation sensitive elements the electrical signals of which are to be put out by said time-seriation output means relatively early in the output sequence, and wherein said internal voltage variation information providing means includes a field effect transistor having source, gate and drain electrode for producing the electrical signal information of internal voltage variation through the source electrode wherein the drain electrode is electrically coupled to said bias voltage receiving means, and the gate electrode is constructed such that a potential variable in accordance with the internal voltage variation in the sensing device is applied to the gate electrode.

* * * * *